United States Patent [19]
Kjos et al.

[11] Patent Number: 6,132,494
[45] Date of Patent: Oct. 17, 2000

[54] PROCESS AND MEANS FOR SEPARATION OF A WELL PRODUCTION STREAM

[75] Inventors: Tore Kjos, Oslo; Helge L. Andersen; Marius Fr. Voigt, both of Nesbru, all of Norway

[73] Assignee: READ Group A/S, Nesbru, Norway

[21] Appl. No.: 09/011,957

[22] PCT Filed: Nov. 27, 1995

[86] PCT No.: PCT/NO95/00218

§ 371 Date: Feb. 23, 1998

§ 102(e) Date: Feb. 23, 1998

[87] PCT Pub. No.: WO97/07868

PCT Pub. Date: Mar. 6, 1997

[30] Foreign Application Priority Data

Aug. 24, 1995 [NO] Norway ..................................... 953318

[51] Int. Cl.⁷ .................................................. B01D 19/00
[52] U.S. Cl. ................................ 95/243; 95/254; 95/259; 95/261; 96/182; 96/195; 210/188; 210/512.2; 210/788
[58] Field of Search ............................. 95/241, 243, 253, 95/254, 259, 261; 96/180, 182, 183, 184, 176, 177, 193, 195; 210/188, 788, 512.1, 512.2

[56] References Cited

U.S. PATENT DOCUMENTS

| | | |
|---|---|---|
| 2,730,190 | 1/1956 | Brown et al. .............................. 95/253 |
| 2,765,045 | 10/1956 | Meyers ...................................... 96/184 |
| 3,704,567 | 12/1972 | Engel ........................................ 96/183 |
| 4,369,047 | 1/1983 | Arscott et al. ............................ 95/243 |
| 4,424,068 | 1/1984 | McMillan .................................. 95/243 |
| 4,948,393 | 8/1990 | Hodson et al. ........................... 95/253 |
| 4,968,332 | 11/1990 | Maher ....................................... 96/184 |
| 5,049,277 | 9/1991 | Kalnins . |
| 5,302,294 | 4/1994 | Schubert et al. .......................... 95/253 |

FOREIGN PATENT DOCUMENTS

| | | | |
|---|---|---|---|
| 923680 | 9/1992 | Norway . | |
| 925052 | 12/1992 | Norway . | |
| 925053 | 12/1992 | Norway . | |
| 997721 | 2/1983 | U.S.S.R. ................................ | 96/182 |
| 1407507 | 7/1988 | U.S.S.R. ................................ | 96/184 |
| 2258167 | 2/1993 | United Kingdom ..................... | 95/253 |
| WO 91/14492 | 10/1991 | WIPO . | |
| WO 92/19350 | 11/1992 | WIPO . | |
| WO 92/19352 | 11/1992 | WIPO . | |

*Primary Examiner*—Duane S. Smith
*Attorney, Agent, or Firm*—Browdy and Neimark

[57] ABSTRACT

The invention relates to a system for separating oil/water/gas from a marginal field by using a combination of a coarse separator with short treatment duration which separates into three flows where one obtains an oil concentration of over 70%, a water concentration of over 70% and a gas quality for burning off, where the oil and water flows are treated in cyclone systems having defined geometric proportions and a gas portion is reinjected into the water injection flows without the use of a compressor. Gas/liquid cyclones may also be used before the choke valve so that the gas pressure is kept, or optionally reinjected or used for injector pump operation of low pressure wells.

16 Claims, 5 Drawing Sheets

PROCESS AND MEANS FOR SEPARATION OF A WELL PRODUCTION STREAM

FIELD OF THE INVENTION

The invention relates to a method for separating a well production flow consisting of a mixture of oil, water and gas, where oil/water/gas are subjected to a static separation process and are split into a light and a heavy phase, ie, a gas phase and a liquid phase.

BACKGROUND OF THE INVENTION

The invention also relates to an apparatus for separating a well production flow consisting of a mixture of oil, water and gas, comprising a static separator for separating a well production flow into a light and a heavy phase, ie, a gas phase and a liquid phase.

In connection with the growing need to recover oil from so-called marginal fields, there has been an increase in the need for light, compact, flexible and cost-effective processing equipment.

Many of today's known marginal fields would not be capable of providing a proper yield without the costs of the processing plants being reduced from today's level. A typical processing plant for an oil field consists of oil/water separation and stabilisation, water purification, a water injection unit and a gas reinjection unit.

As a rule, production from marginal fields will be carried out from ships or smaller vessels which are equipped with the most essential processing systems. It is therefore of great importance that the processing equipment also functions satisfactorily during quite large movements, eg, during surging, heaving and tilting.

Today, oil/water separation from an oil reservoir is carried out in large static gravitation separators where the separation takes place under the force of gravity. Drawing off takes place through respective overflows and underflows having great differences in height so that it is simple to draw off a pure phase which has been separated.

Static gravitation separators are large and heavy and not very serviceable for producing from marginal fields at great depths of water, from floating platforms or vessels in motion, from the seabed or directly in the reservoir. There is therefore a need for a reduction in the physical dimensions of the units, and it is thus one of the objectives of the present invention to propose measures which allow the physical dimensions of separation units to be greatly reduced.

SUMMARY OF THE INVENTION

According to the invention, a method is therefore proposed as mentioned above, said method being characterised in that the liquid phase, in a dehydration step, is subjected to a dynamic separation process and is split into a light and a heavy phase, ie, an oil phase and a water phase, and that the water phase, in a de-oiling step, is subjected to a dynamic separation process in order to produce pure, produced water and reject.

Similarly, according to the invention, an apparatus is proposed as mentioned above, said apparatus being characterised by a dehydration step after the static separator and comprising at least one cyclone for splitting the liquid phase into a light and a heavy phase, ie, an oil phase and a water phase, and a de-oiling step after the static separator and comprising at least one cyclone for producing pure, produced water and reject.

Today's established technology in the field of liquid/liquid cyclones consists of, cyclones having countercurrent spin, ie, the light phase flows countercurrent to the top reject and the heavy phase passes out in the bottom reject. One area of application for such cyclones is to purify produced water where the light phase (oil) is a small volume flow, maximum 5,000 ppm oil (0.5%), compared with the heavy phase (water), which is 99.5% of the volume flow.

If the portion of the light phase is increased in a countercurrent cyclone, the outlets will be crucial. A choice must be made as to which phase is to be given priority.

One of the specific aims of the present invention is to utilise the effect of the use of countercurrent and cocurrent spin in the cyclones. By varying the cocurrent spin portion, one can vary the duration and separation of the light phase so that the portion of the heavy phase increases along the axis of the cyclone so that "critical concentration" is passed (can vary from 5 to 90%) and the system goes over to a defined water-continuous system (the heavy phase is water). This gives improved separation properties and the possibility of obtaining a pure light and a pure heavy phase.

On separation in cocurrent flow, the rotation of great concentrations of the light phase with the heavy phase is achieved.

BRIEF DESCRIPTION OF THE DRAWINGS

The invention shall now be described in more detail with reference to the drawings, wherein.

DETAILED DESCRIPTION OF THE INVENTION

Figure 1:
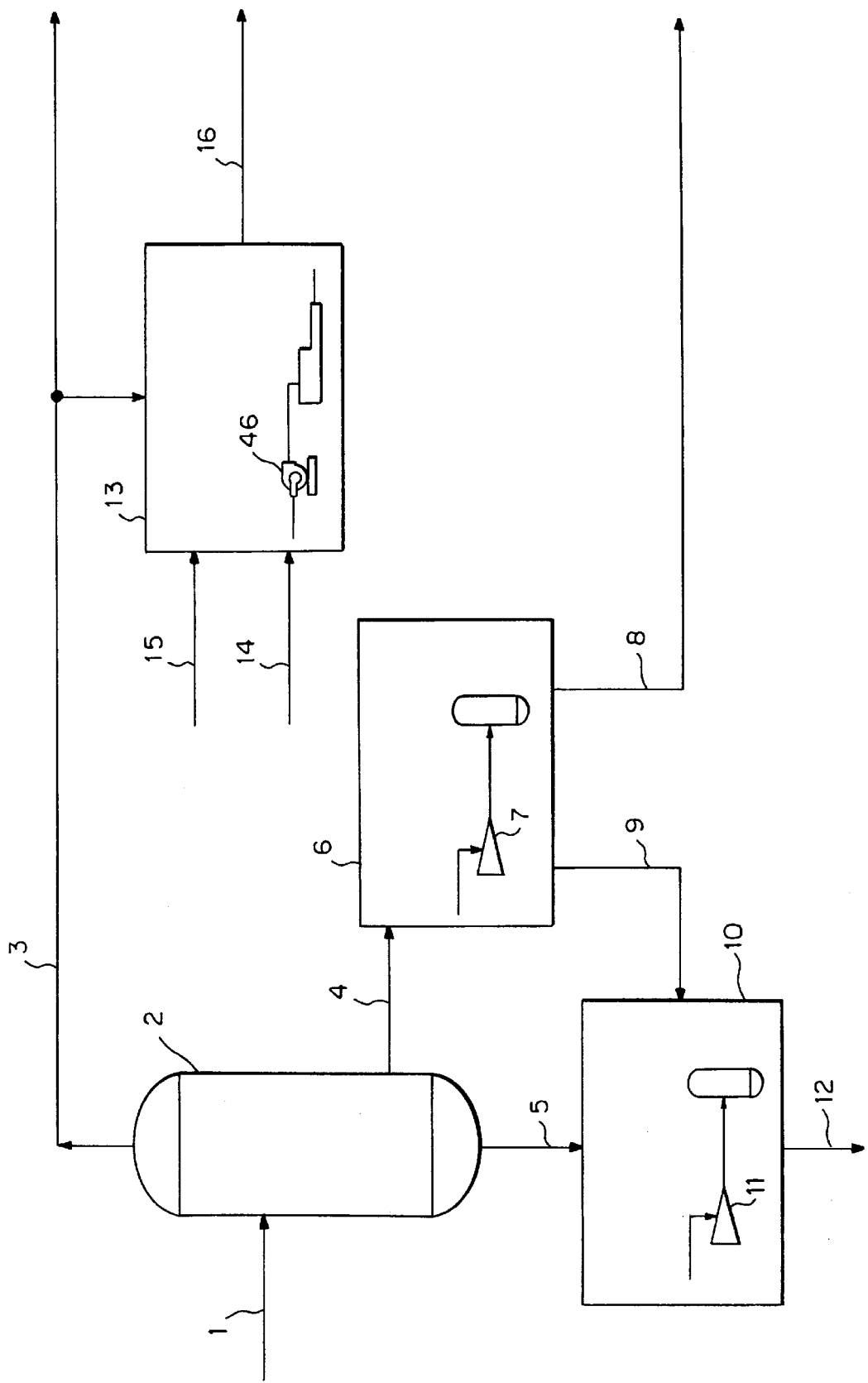
FIG. 1 is a basic diagram of the invention.

The function of the units which are shown schematically in FIG. 1 is to separate oil, water and gas which flow up from an oil reservoir. The completely processed oil and the water will satisfy current requirements for stabilised oil intended for sale and for produced water that is to be used for reinjection or emptied into the sea. The gas is used as fuel gas or for reinjection.

In FIG. 1, a well production flow 1 comes from an oil reservoir (not shown) and passes into a static separator in the form of a coarse separator tank 2. The separator 2 is in this case designed as a three-phase separator. The incoming flow 1 consists of oil, water and gas. This flow is separated in the separator 2 into a gas portion which passes out through a gas line 3 from the top of the separator, a flow 4 which primarily consists of oil, and a flow 5 which primarily consists of water.

The flow 4 consisting primarily of oil is processed further in an oil/water/gas separation module 6. The process therein is based on the use of hydrocyclones 7 in order to be able to achieve an effective separation. The use of hydrocyclones also results in it being possible for the separation equipment to be made far smaller than conventional equipment for the same process. Stabilised, water-free oil passes from the module in a flow 8. Released gas will pass (not shown) to the flare or fuel gas system, whilst water will pass as a flow 9, for further treatment in a produced water module 10. The module 10 also receives a flow 5, which primarily consists of water from the separator 2. The water in the flow 9 contains too much oil to be capable of being conducted straight into the sea.

The process in the module 10 is also based on the use of hydrocyclones 11. Residual oil which is separated from the water is returned (not shown) to the oil/water/gas separation module 6, whilst the purified water, which now contains less than 40 mg oil/liter water is emptied into the sea or is reinjected in to the reservoir as a flow 12.

The flow 3, which consists of gas from the separator 2 is conducted to a water injection module 13. In this module 13, the gas (flow 3) is mixed with seawater 14 and/or produced water 15. The seawater is deoxygenated by means of a process which, for example, is taught and described in Norwegian Patent Publication No. 160805, or another type of deoxygenation process. Injection water passes out as a flow 16 from the module 13.

Figure 2:
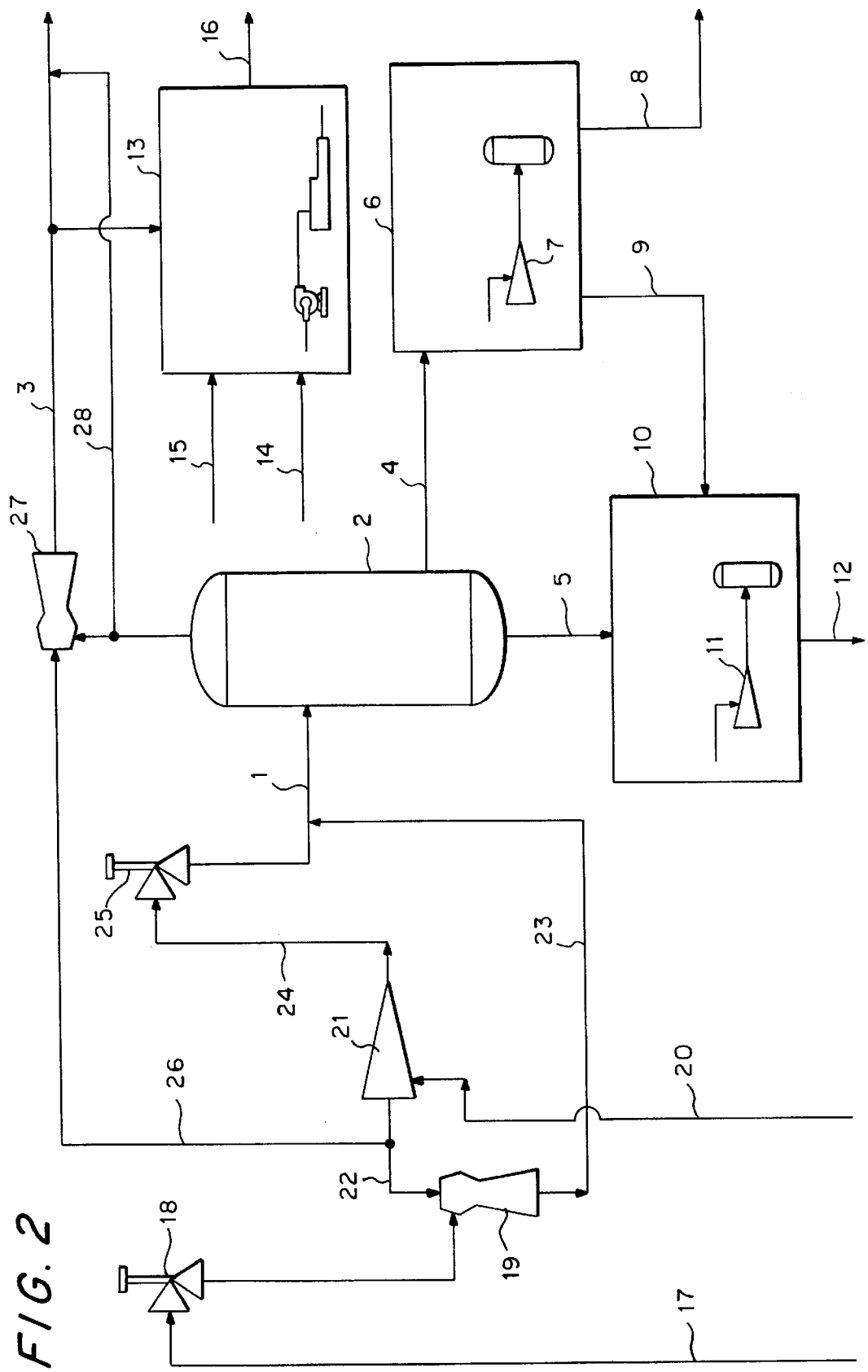
FIG. 2 is a modified process diagram.

FIG. 2 shows a modified embodiment of the system in FIG. 1, where in front of the separator 2 there is provided an ejector cyclone system which receives a well production flow from a well having higher pressure and one (or more) wells having medium or lower pressure.

The production flow from a well having lower pressure is designated 17 and passes via a choke valve 18 to an ejector 19. A production flow 20 comes from a well of higher pressure and passes to a hydrocyclone 21. As shown, the top reject 22 passes to the ejector 19. From the ejector 19, a flow 23 passes to the separator 2. The bottom reject 24 from the cyclone 21 passes via a choke valve 25 to the separator 2.

From the top reject flow 22, a flow 26 branches off to an ejector 27. The gas flow from the separator 2 passes to the ejector 27 and from the ejector the gas flow passes on as shown at 3. A bypass flow 28 for the gas from the separator 2 is shown.

In other respects, the system in FIG. 2 corresponds to the system shown in FIG. 1 and described above.

Thus, in FIG. 2 the flow 3 is a combination of the flow 26 from the cyclone 21 and gas from the separator 2.

Figure 3:
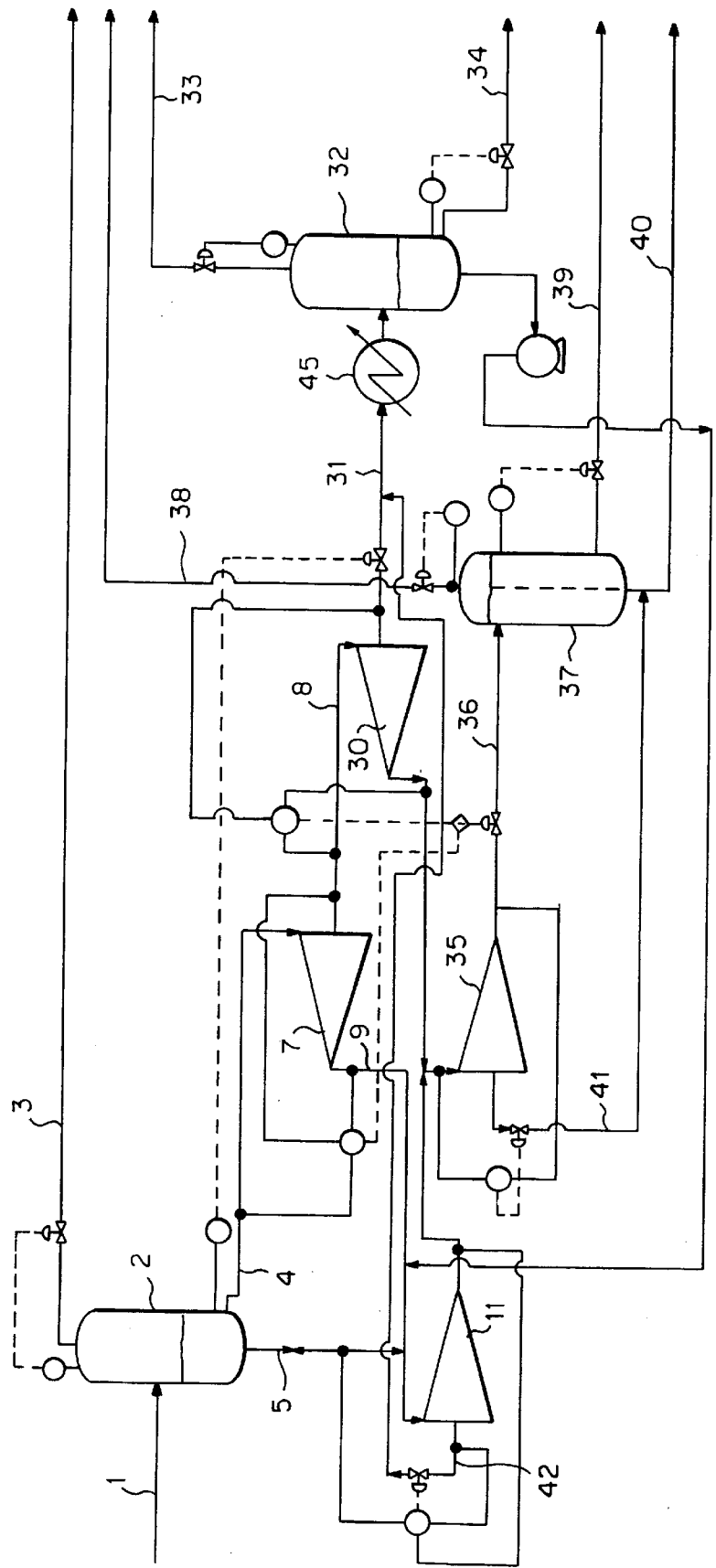
FIG. 3 is a more detailed flow chart for the implementation of the method according to the invention.

FIG. 3 shows a more detailed flow chart. With reference to FIG. 1, the same reference numerals are used for the components which are also found in FIG. 1.

In FIG. 3, a production flow 1 passes to the separator 2. The flow 4, which primarily contains oil, passes to a cyclone 7 which forms a part of the module 6 shown in FIG. 1. The bottom reject from the cyclone 7 passes as a flow 9 to a cyclone 11, which forms a part of the module 10 shown in FIG. 1. The top reject 8 from the cyclone 7 passes to a dehydration cyclone 30, which also belongs to the module 6 in FIG. 1. The top reject from the dehydration cyclone 30 passes as a flow 31 to a tank 32 where gas is separated at the top and passes as a flow 33, eg, to a flare burner. Oil passes as a flow 34 from the tank 32 to a store.

The top reject from the cyclone 11, ie, the water flow 12 passes together with the bottom reject 52 from the dehydration cyclone 30 to a de-oiling cyclone 35. From the de-oiling cyclone 35, the bottom reject (water) 36 passes to a tank 37 whence a gas flow 38 will flow, for example, to a flare burner, a water flow 39 to the sea, and an oil-polluted flow 40 to a closed drain. As shown, the top reject 41 (oil) passes together with the polluted flow 40.

Water from the tank 32 can, as shown, pass to the cyclone 11 by means of a pump 53. The top reject 42 from the cyclone 11 passes as shown to the flow 31 (top reject from the dehydration cyclone 30).

The tank 32 is a so-called surge tank. The tank 37 is a degassing tank for the produced water which comes as a flow 36 from the de-oiling cyclone 35. Reference numeral 45 denotes a heating device. The flow of produced water 39 from the degassing tank 37 may, as mentioned, pass into the sea, but may also be used for water injection.

Reference shall now be made once more in particular to FIG. 1, as the conditions around the gas flow 3, ie, its further processing after the separator 2, shall now be explained in detail.

The flow 3, which consists of gas from the separator 2 (and/or of gas from the cyclone 21 in FIG. 2) may pass straight to a flare burner or to a water reinjection system, ie, to the module 13. In this module 13, gas is mixed with seawater 14 and/or produced water 15. Gas and produced water are mixed and pumped further at high pressure by means of a two-phase pump 46, as a flow 16. This flow 16 may be injected into the oil reservoir in order to sustain the pressure, which will help to increase the recovery rate of the field. At the same time, the emission of gas into the atmosphere will be reduced.

A conventional system for reinjection of gas will normally consist of several steps including compressors, coolers and separators (scrubbers). This is a complex solution which requires major investments and a large space.

With the invention as described below, it is possible to reduce the investments and space requirements considerably.

Figure 4:
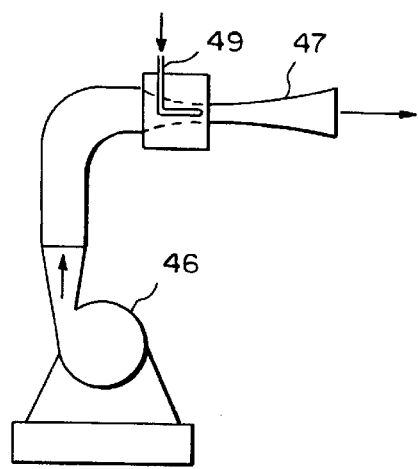
FIG. 4 illustrates a two-phase pump with accompanying ejector.
Figure 5:
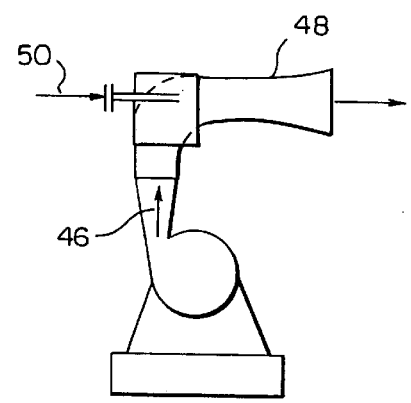
FIG. 5 shows a modified embodiment of the pump arrangement in FIG. 4.

To gain best possible utilisation of the increase in pressure on the injection of gas into the water injection flow, at the same time as the gas is to be dispersed to gain best possible pump conditions, it is of advantage to use an ejector 47 as shown in FIG. 4. FIG. 5 shows a second embodiment of an arrangement having an ejector 48. Gas is conducted in as shown by means of the arrow 49 in FIG. 4 and the arrow 50 in FIG. 5. In FIG. 4, the gas is an ejector drive medium at high gas pressure in the separator 2, whilst the suction pressure goes against the supply pressure from the pump 46. The solution in FIG. 5 may be suitable when the gas pressure is low. In FIG. 5, the gas 50 is drawn into the water injection flow and is distributed in small gas bubbles. The drive pressure is thus the water from the pump 46.

The ratio of gas for burning off to gas for the water injection flow can be regulated. This will make possible simultaneous water/gas injection or alternating water and gas injection, which in turn will allow the establishment of gas/water fronts in the reservoir in order to increase the efficiency of the water injection. At the same time, flaring is reduced, which may be an absolute necessity for the grant of permission to start production.

Figure 6:
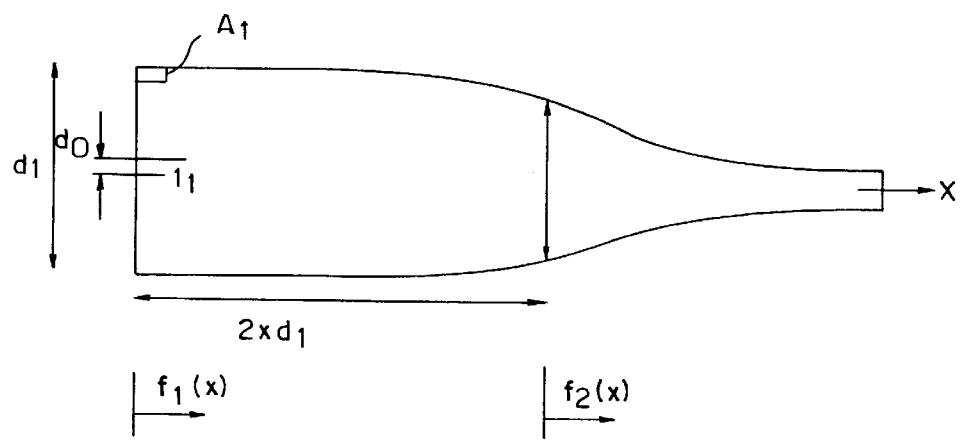
FIGS. 6–10 are purely schematic illustrations of various cyclone embodiments.

The cyclones used are vital components of the system. In FIG. 6, a cyclone is shown which may be called a bulk cyclone and which can be used as cyclone 7, see FIG. 3. The cyclone shown in FIG. 6 is a combined cocurrent and countercurrent cyclone having geometric proportions as follows:

$d_0/d_2 = 0.1-1.0$; $l_0/d_2 = 3-11$; swirl-figure $Sw = \mu . d_1 \times d_2/4$;

$A_1 = 3-15$ and the countercurrent spin portion $l_1 = (0-3)d_1$.

$A_1$ is the sum of all inflow cross-sections $90°$ to the flow direction.

Figure 7:
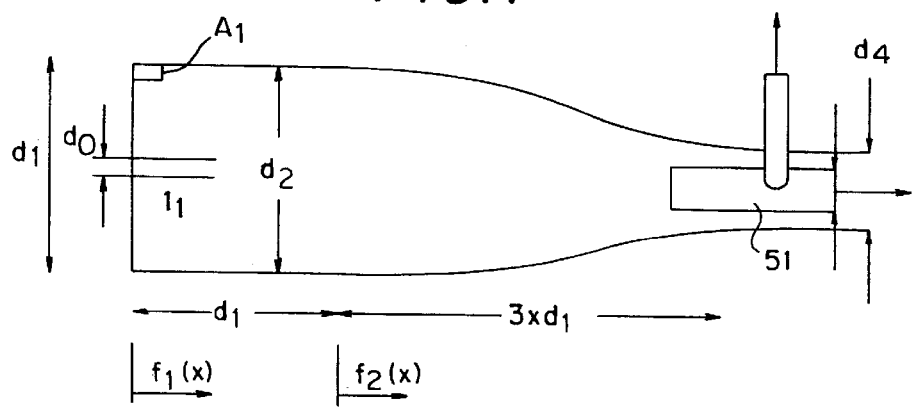

FIG. 7 shows a cyclone which is highly suitable as a dehydration cyclone 30, see FIG. 3. The cyclone shown in FIG. 7 is primarily a cocurrent flow cyclone with the following geometric proportions:

$d_0/d_2 = 0.1-1.0$; conical length $l/d_2 = (1-5)$; cylindrical length $= (1-3)d_1$; $Sw = 1-30$; central oil outflow in bottom $d_3=d_1/1.2-d_1/10$; tangential water outflow in the bottom $d_u=D_1/1.05-d_1/4$; and countercurrent spin portion $l_1/d_1=0-2$.

As mentioned, the coarsely separated water flow 5, which contains more than 70% water, is conducted to a produced water treatment module 10. As is illustrated in FIG. 3, this module includes both bulk cyclones 11 and de-oiling cyclones 35.

Figure 8:
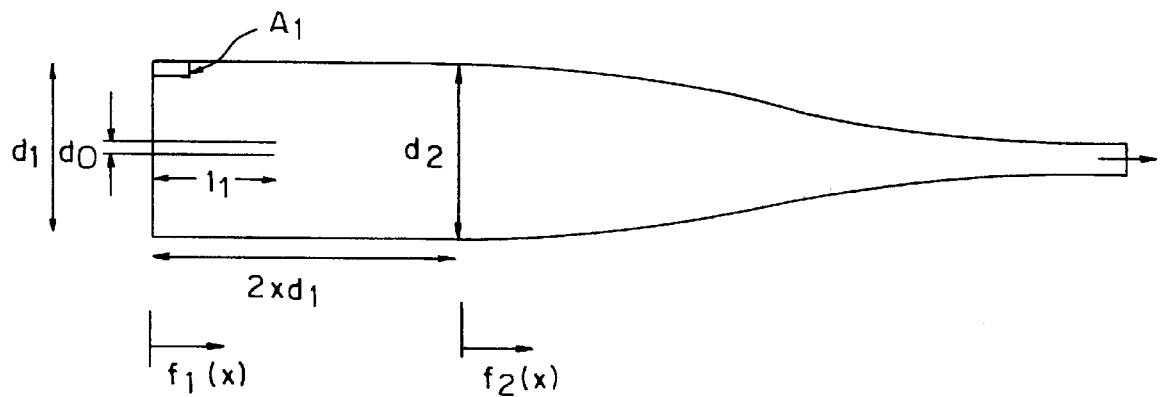

The bulk cyclone 11 shown in FIG. 3 may have the same form as that described above in connection with FIG. 6. The de-oiling cyclone 35 may, for example, be as in FIG. 8, in the form of a substantially countercurrent spin cyclone which makes use of a flotation effect or coalescence effect, ie, microbubbles which arise on a drop in pressure in a saturated gas/liquid mixture. Microbubbles collide with small oil droplets and form strong bonds (oil membrane on the gas bubble) having low density and capable of being readily separated. The geometric proportions may be:

$d_0=d_2=0.05-0.5$, $l/d_2=3-15$ and $Sw=12-30$, having a counter spin portion $l_1/d_1=0-2$.

Figure 9:
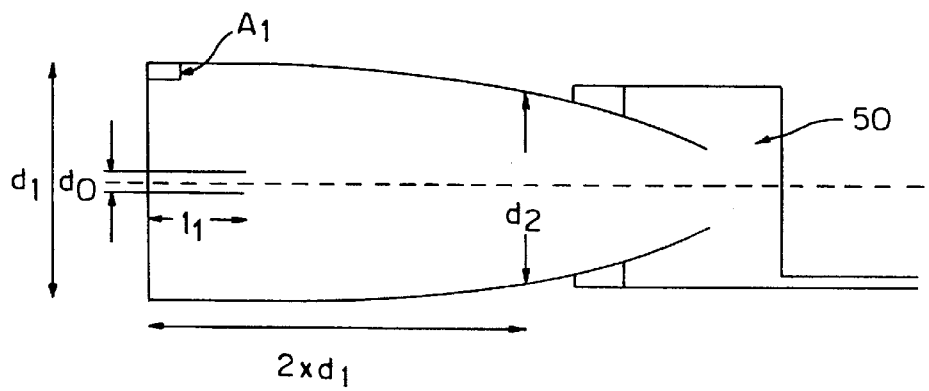

The cyclone 21 used before the separator in FIG. 2 may, for example, be a cyclone as shown in FIG. 9, which separates two phases gas/liquid with a slug catcher volume 50 to even out the flow on further to a bulk separator step or to the coarse separator 2. The advantages gained by using this cyclone, which is shown in FIG. 2, for separation is that it can be used prior to any form of pressure reduction, so that the gas pressure can be sustained for reinjection into the water injection flow or as driving pressure for low pressure wells. The geometric proportions of the cyclone shown in FIG. 9 may, for example, be:

$d_0/d_2=0.05.0.5$, $l/d_2=1-5$, $Sw=1-30$, with a countercurrent spin portion $l_1/d_1=0-4$.

Figure 10:
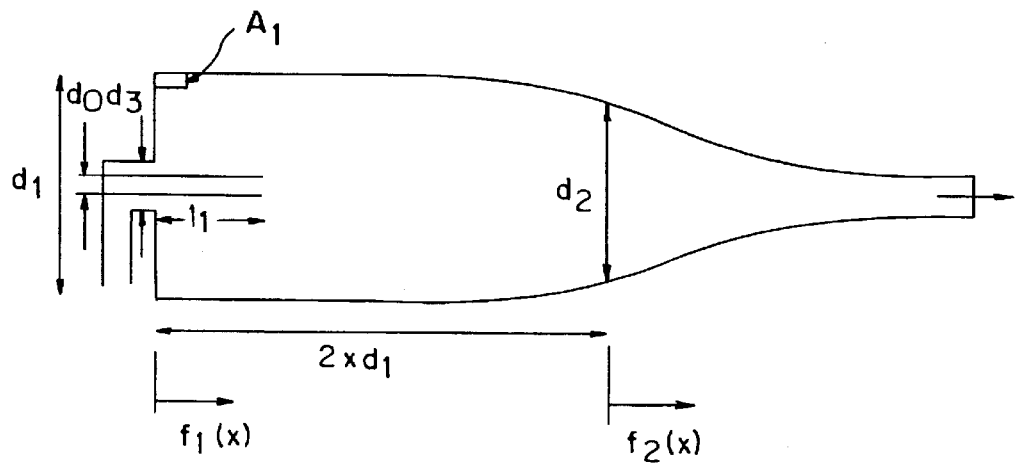

FIG. 10 illustrates a typical three-phase bulk separation cyclone where countercurrent spin is achieved by a central annular outlet $d_3$ around the core pipe $d_0$. The cyclone in FIG. 10 thus has combined cocurrent spin and countercurrent spin. For the cyclones it is the case that cocurrent spin is achieved by a tangential inflow $A_1$ uppermost at the greatest diameter of the cyclone and a central draw-off pipe $d_0$. The water phase circulates in cocurrent flow with the oil droplets so that an extended period in the separation zone is achieved. In the space $l_1$ from the top, the thickened/pure oil phase is drawn off through the central core pipe $d_0$. The heavy phase passes out through the bottom outflow. In FIG. 7, the cyclone has a bottom outflow where the oil core is drawn into a central outflow 51. In a water outflow around the central outflow 51 there is a tangential water ring having diameter $d_4$.

One of the advantages of the invention is that the whole system can be dimensioned for well pressure. As a consequence of the use of cyclones and shorter period in the coarse separators, the pressure tanks in the system will require a smaller diameter and thus walls of a smaller thickness. The gas flare systems may be reduced significantly and the liquid will be subjected to lesser shearing stress throughout the pressure reduction so that the separation properties are improved.

What is claimed is:

1. In a method for separating a well production flow consisting of a mixture of oil, water, and gas where the oil/water/gas mixture is subjected to a static separation process and are split into a light gas phase and a heavy liquid phase, the improvement comprising subjecting the liquid phase in a dehydration step to a dynamic separation process and splitting the liquid phase into a light oil phase and a heavy water phase and subjecting the water phase in a deoiling step to a dynamic separation process in order to produce pure produced water and reject, and injecting the gas phase into a water injection flow by a booster or injector pump.

2. A method as disclosed in claim 1 further comprising splitting the liquid phase from the static separation process in the dehydration step into an oil continuous phase having an oil concentration of 70% or more and a water continuous phase having a water concentration of 70% or more.

3. A method as disclosed in claim 1 further comprising separating the liquid phase in the dynamic separation process of the dehydration step by a cyclone using combined co-current and counter-current spin.

4. A method as disclosed in claim 1 further comprising separating the water phase in the dynamic separation process of the deoiling step by a cyclone using combined co-current and counter-current spin.

5. A method as disclosed in claim 1 further comprising recycling the reject to the dynamic separation process of the liquid phase deoiling step.

6. A method as disclosed in claim 1 further comprising injecting the gas phase into a water injection flow which contains produced water.

7. A method as disclosed in claim 1 further comprising operating the method at well pressure.

8. A method as disclosed in claim 1 further comprising separating the well production flow in a dynamic separation process before the static separation process.

9. A method as disclosed in claim 7 further comprising subjecting a well production flow from a high pressure well to a dynamic separation process, conducting the top reject therefrom to an ejector for actuating a well production flow having a lower pressure, and further subjecting the combined well production flow from the ejector to the static separation process.

10. In an apparatus for separation of a well production flow (1) of a mixture of oil, water and gas, comprising a static separator (2) for separating the well production flow into a light gas phase and a heavy liquid phase, the improvement comprising a dehydration stage (6) after the static separator (2), which dehydration stage comprises at least one cyclone (7) for splitting the liquid phase into a light oil phase and a heavy water phase, a de-oiling stage (10) after the static separator and comprising at least one cyclone (11) for producing pure, produced water (12) and reject, and a booster or injector pump (46) for infecting the gas chase into a water injection flow.

11. An apparatus as disclosed in claim 10 wherein the at least one cyclone in the dehydration stage is a cyclone which functions using combined co-current and counter-current spin.

12. An apparatus as disclosed in claim 10 wherein the at least one cyclone in the deoiling stage is a cyclone which functions using combined co-current and counter-current spin.

13. An apparatus as disclosed in claim 10 wherein the at least one cyclone of the dehydrating stage and the deoiling stage have a tangential inflow uppermost in the greatest diameter of the at least one cyclone, a central upper draw-off pipe and a bottom outflow.

14. An apparatus as disclosed in 13 wherein an annular upper outflow is around the central upper draw-off pipe.

15. An apparatus as disclosed in claim 13 wherein a drainage pipe is outside the bottom outflow.

16. An apparatus as disclosed in claim 10, characterised by cyclones with ratios:

diameter/diameter ratio: $d_0/d_2$ $d_0$ = diameter top reject $d_2$ = diameter in the space $2 \times d_1$ from inflow $d_1$ = diameter at inflow length/diameter ratio: $l/d_2$ l = length of cyclone from inflow $A_1$ = sum of all inflow cross-sections 90° to flow direction cocurrent spin portion: $l_1/d_1$ where $l_1$ = core pipe length Swirl figure: $SW = \dfrac{\mu \cdot d_1 \cdot d_2}{4\,A_1}$ For gas/liquid separation  $d_0/d_2 = 0.05\text{-}0.5$, $Sw = 1\text{-}30$,
$l/d_2 = 1\text{-}5$, $l_1/d_1 = 0\text{-}4$ For bulk separator  $d_0/d_2 = 0.1\text{-}0.8$, $Sw = 1\text{-}30$,
$l/d_2 = 1\text{-}5$, $l_1/d_1 = 0\text{-}3$ For de-oiling cyclone  $d_0/d_2 = 0.05\text{-}0.5$, $Sw = 12\text{-}30$,
$l/d_2 = 3\text{-}15$, $l_1/d_1 = 0\text{-}2$ For dehydration cyclone  $d_0/d_2 = 0.05\text{-}1.0$, $Sw = 1\text{-}30$,
$l/d_2 = 1\text{-}5$, $l_1/d_1 = 1\text{-}5$ having a shape where the conical part is a continuous function formed by circles, exponential or sinus functions where the actual funnel shape of the cyclone is a continuous form where the conical portion is made up of an upper portion where $f_1(x) = A.\ 58.5 + 13.5.\ B.\ \cos(2\mu x/193.83.\ C)$, or $f_1(x) = A.\ 72 - 26.6.\ B.\ \sin(2\mu x/393.\ C)$ $A = 0.1\text{--}176$ $B = 0.3\text{--}355$ $C = 0.1\text{--}3$ and a lower portion where $f_2(x) = 2200.\ A(246.\ B + X)^{-\frac{1}{3} \cdot C}$ $A = 0.01\text{--}499$ $B = 0.3\text{--}750$ $C = 0.1\text{--}8.$

* * * * *